Figure 1:
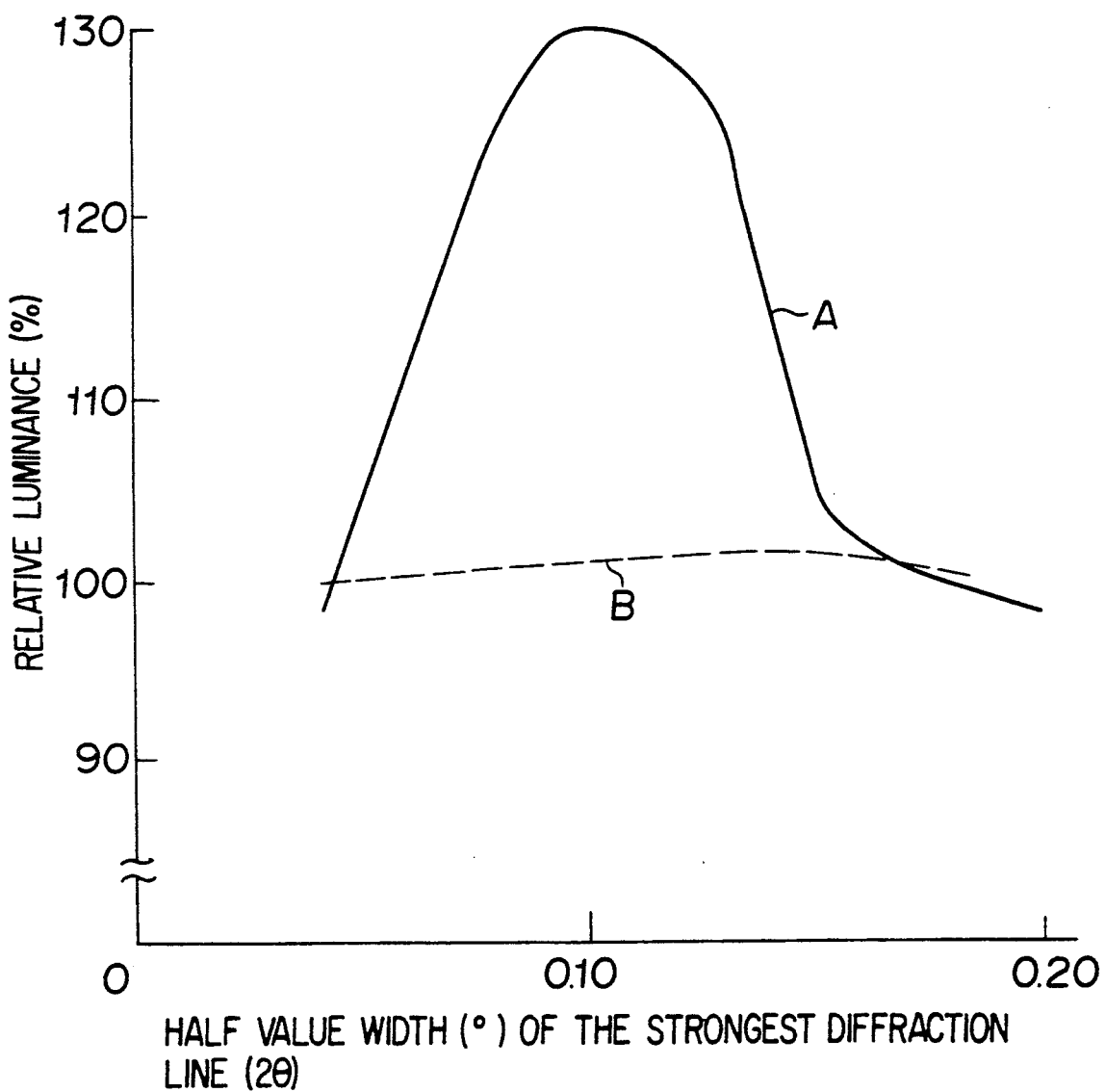

United States Patent

Takahashi et al.

[11] Patent Number: 5,132,044
[45] Date of Patent: Jul. 21, 1992

[54] FLUORESCENT COMPOSITION FOR LOW VELOCITY ELECTRON BEAM EXCITATION

[75] Inventors: Fumio Takahashi, Odawara; Kunihiko Yoneshima, Hiratsuka, both of Japan

[73] Assignee: Kasei Optonix, Ltd., Tokyo, Japan

[21] Appl. No.: 727,450

[22] Filed: Jul. 9, 1991

[30] Foreign Application Priority Data

Jul. 9, 1990 [JP] Japan .................. 2-180970

[51] Int. Cl.$^5$ ............................................. C09K 11/56
[52] U.S. Cl. .......................... 252/301.6 S; 252/301.5; 252/301.6 F; 313/495
[58] Field of Search ............ 252/301.6 S, 301.5, 252/301.6 F; 313/495

[56] References Cited

U.S. PATENT DOCUMENTS

| | | | |
|---|---|---|---|
| 4,275,333 | 6/1981 | Kagami et al. | 252/301.6 S |
| 4,680,231 | 7/1987 | Yamaura et al. | 252/301.6 S |
| 5,032,316 | 7/1991 | Takahashi et al. | 252/301.6 S |

FOREIGN PATENT DOCUMENTS

| | | |
|---|---|---|
| 0353653 | 2/1990 | European Pat. Off. |
| 52-10875 | 1/1977 | Japan .................. 252/301.6 S |
| 53-132489 | 11/1978 | Japan .................. 252/301.6 S |

Primary Examiner—Jack Cooper
Attorney, Agent, or Firm—Oblon, Spivak, McClelland, Maier & Neustadt

[57] ABSTRACT

A fluorescent composition for low velocity electron beam excitation, comprising a phosphor containing a sulfide of the formula $(Zn_{1-x},Cd_x)S$ wherein x is a number satisfying a condition of $0 \leq X \leq 1$, as the host material, and an electrically conductive material mixed or mutually adhered to each other, wherein the half value width ($2\theta$) of the strongest diffraction line in the diffraction X-ray spectrum of said sulfide is within a range of from 0.05° to 0.16°.

9 Claims, 1 Drawing Sheet

FLUORESCENT COMPOSITION FOR LOW VELOCITY ELECTRON BEAM EXCITATION

The present invention relates to an improvement in a fluorescent composition for low velocity electron beam excitation, which is composed of a mixture comprising a phosphor containing a sulfide as the host material, and a material having electrical conductivity (hereinafter referred to as a conductive material) and which exhibits emission of light of high luminance under excitation with a low velocity electron beam at an acceleration voltage of not higher than about 1 kV (hereinafter referred to simply as a "fluorescent composition").

Fluorescent compositions obtained by mixing conductive materials such as indium oxide ($In_{23}$), zinc oxide (ZnO) and tin oxide ($SnO_2$) with a series of sulfide phosphors consisting essentially of a sulfide of the formula $(Zn_{1-x},Cd_x)S$, wherein x is a number satisfying a condition of $0 \leq x \leq 1$, as the host material, which is activated by zinc (Zn), silver (Ag), gold (Au), copper (Cu), manganese (Mn) or the like and further coactivated by halogen, aluminum (Al), gallium (Ga), indium (In) or the like, exhibit visible emissions of high luminance ranging from blue to red specific to the sulfide phosphors which are the main components of the fluorescent compositions, under excitation by a low velocity electron beam at an acceleration voltage of not higher than about 1 kV (Japanese Examined Patent Publications No. 33153/1984, No. 33155/1984, No. 44035/1987 and No. 53554/1987). Therefore, such fluorescent compositions have recently found much use as the fluorescent screens for fluorescent display tubes capable of multi-color displaying in combination with ZnO:Zn which has been used since old as a phosphor showing greenish white emission, which are useful for automobiles (as displays for clocks, car audios, speed meters or tachometers), audio-visual appliances, video tape recorders (VTR), etc.

However, especially in the case of fluorescent display tubes for automobiles, there is a limitation in the acceleration voltage for the fluorescent display tubes in view of the power sources to be used, whereby according to the conventional technique, the luminance of the fluorescent display tubes is inadequate, particularly it lacks in the visibility under the external daylight, and this causes a problem from the viewpoint of the safe driving of the automobiles.

The present invention has been made in view of these circumstances, and aims at providing a fluorescent composition capable of emitting light with higher luminance when excited by a low velocity electron beam at an acceleration voltage of not higher than about 1 kV.

In order to attain the above object, the present inventors have conducted extensive researches on the relations between the types and physical properties of sulfide phosphors, and the luminance of the fluorescent compositions thereby obtained, with respect to sulfide phosphors constituting fluorescent compositions composed of mixtures comprising sulfide phosphors and conductive materials, which are presently used for fluorescent display tubes capable of multi-color displaying. As a result, they have discovered that the luminance of the fluorescent composition varies substantially depending upon the degree of crystallization of the sulfide phosphor used, and a fluorescent composition having a particularly high luminance can be obtained by controlling the degree of crystallization of the sulfide phosphor to be within a certain range. Namely, there is an interrelation between the half value width ($2\theta$) of a diffraction line in the diffraction X-ray spectrum of a crystal (showing the relation between the intensity of the diffraction line and the double angle ($2\theta$) of the angle of diffraction ($\theta$) of the X-rays by the crystal when X-rays were irradiated to the crystal) and the degree of crystallization of the crystal, i.e. the narrower the half value width, the larger the degree of crystallization. Accordingly, with respect to various sulfide phosphors prepared under various synthetic conditions, diffraction X-ray spectra were measured, and the half value widths of the strongest diffraction lines among the diffraction lines at the index of plane [1,0,0] of the respective sulfide phosphors (hereinafter referred to simply as the "strongest diffraction lines") were obtained. At the same time, the interrelation of the half value widths with the luminance properties under low velocity electron beam excitation of the respective fluorescent compositions using such sulfide phosphors was investigated. As a result, it has been found that a fluorescent composition having a particularly high luminance can be obtained when a sulfide phosphor having a half value width ($2\theta$) of the strongest diffraction line in the X-ray diffraction spectrum within a range of from 0.05° to 0.16°, is employed, and the present invention has been accomplished on the basis of this discovery.

The present invention provides a fluorescent composition for low velocity electron beam excitation, comprising a phosphor containing a sulfide of the formula $(Zn_{1-x},Cd_x)S$ wherein x is a number satisfying a condition of $0 \leq x \leq 1$, as the host material, and a conductive material mixed or mutually adhered to each other, wherein the half value width ($2\theta$) of the strongest diffraction line in the diffraction X-ray spectrum of said sulfide is within a range of from 0.05° to 0.16°.

Curve A in FIG. 1 is a graph showing the relation between the half value width ($2\theta$) of the strongest diffraction line in the diffraction X-ray spectrum of a $(Zn_{0.29},Cd_{0.71})S:Ag,Cl$ phosphor used in a fluorescent composition comprising the $(Zn_{0.29},Cd_{0.71})S:Ag,Cl$ phosphor and $In_2O_3$ and the relative luminance of the fluorescent composition under low velocity electron beam excitation.

Curve B in FIG. 1 is a graph showing the relation between the half value width ($2\theta$) of the strongest diffraction line in the diffraction X-ray spectrum of a $(Zn_{0.29},Cd_{0.71})S:Ag,Cl$ phosphor and the relative luminance of the fluorescent composition under high velocity electron beam excitation.

Now, the process for producing the fluorescent composition of the present invention will be described in detail.

The $(Zn_{1-x},Cd_x)S$ type sulfide phosphor to be used as one of the constituting components of the fluorescent composition of the present invention is selected among sulfide phosphors composed of a sulfide host material of the formula $(Zn_{1-x},Cd_x)S$ which is activated by an activator such as zinc (Zn), silver (Ag), copper (Cu), gold (Au) or manganese (Mn) and, if necessary, further coactivated by a first coactivator such as aluminum (Al) or a halogen atom (Cl, Br, I or F) and a second coactivator such as an alkali metal element (Li, Na, K, Rb or Cs), gallium (Ga) or indium (In), including ZnS:Zn, ZnS:Ag,Cl, ZnS:Ag,Cl,Li, ZnS:Ag,Al, ZnS:Mn,Cl, (Zn,Cd)S:Cu,Al, (Zn,Cd)S:Au,Al, (Zn,Cd)S:Au,Cu,Al and CdS:Ag, so that it is a sulfide phosphor, of which the half value width ($2\theta$) of the strongest diffraction line in the X-ray diffraction spectrum is within a range of from 0.05° to 0.16°.

When a sulfide phosphor, of which the half value width is within a range of from 0.07° to 0.14°, is used among them, a fluorescent composition having an especially high luminance can be obtained. Further, among the above sulfide phosphors, of which the half value width ($2\theta$) of the strongest diffraction line in the X-ray diffraction spectrum is within a range of from 0.05° to 0.16°, it is preferred to employ a sulfide phosphor of the above formula wherein the x value is within a range of from $0.4 \leq x \leq 0.85$ and which comprises as the host material a solid solution of ZnS and CdS. More preferably, a fluorescent composition having an especially high luminance can be obtained when a sulfide phosphor of $(Zn_{1-x},Cd_x)S:Ag$ type wherein x is within the above range and which is activated by Ag in an amount of from 200 to 2,000 μg per g of the host material.

The $(Zn_{1-x},Cd_x)S$ type sulfide phosphor comprising as the host material a sulfide of the formula $(Zn_{1-x},Cd_x)S$ wherein $Z \leq x \leq 1$, to be used for the fluorescent composition of the present invention, can usually be prepared by a method as described below. Namely, zinc sulfide (ZnS) and cadmium sulfide (CdS) as raw materials for the phosphor host material, are mixed in such a ratio that ZnS will be $(1-x)$ mol while CdS will be x mol (provided $0 \leq x \leq 1$) to obtain a mixed sulfide raw material. To this mixed sulfide raw material, a compound such as a nitrate, a sulfate, a halide or a carbonate of an element for an activator, such as silver nitrate ($AgNO_3$), copper sulfate ($CuSO_4$), chloroauric acid ($HAuCl_4$) or manganese carbonate ($MnCO_3$) and a compound containing aluminum (Al) or a halogen element (Cl, Br, I or F) for the first coactivator, are added in prescribed amounts, and if necessary, a compound containing an alkali metal element (at least one of Li, Na, K, Rb and Cs), gallium (Ga) or indium (In) as the second coactivator and a compound as a flux such as sodium chloride (NaCl), lithium sulfate ($Li_2SO_4$), lithium phosphate ($Li_3PO_4$), potassium iodide (KI), or ammonium chloride ($NH_4Cl$), are further mixed in prescribed amounts. The mixture is packed in a heat resistant container and calcined at a temperature of from 750° to 1,000° C. for from 1 to 10 hours in air or in a sulfurizing atmosphere such as a hydrogen sulfide gas atmosphere or a carbon disulfide gas atmosphere.

With respect to the $(Zn_{1-x},Cd_x)S$ type sulfide phosphor thus obtained, the diffraction X-ray spectrum is then obtained by an X-ray diffractometer, whereupon a phosphor is used, of which the half value width ($2\theta$) of the strongest diffraction line is within a range of from 0.05° to 0.16°.

On the other hand, the conductive material to be used for the fluorescent composition of the present invention may be any conductive material which is useful for a conventional fluorescent composition for low velocity electron beam excitation, such as indium oxide ($In_2O_3$), zinc oxide (ZnO), tin oxide ($SnO_2$), titanium oxide ($TiO_2$), tungsten oxide ($WO_3$), niobium oxide ($Nb_2O_5$), cadmium sulfide (CdS) or copper sulfide (CuS). Particularly when $In_2O_3$ or a compound containing $In_2O_3$, such as a commercially available $In_2O_3$ reagent, $In_2O_3$ obtained by calcining an indium compound such as $In(NO_3)_3$ or $InCl_3$, $In_2O_3$ activated by rare earth such as Eu or Ce as disclosed in e.g. Japanese Unexamined Patent Publication No. 110181/1980, or a solid solution of $In_2O_3$ and $SnO_2$ is used, it is possible to obtain a fluorescent composition having an especially high luminance.

To produce the fluorescent composition of the present invention, prescribed proportions of the above conductive material and the selected phosphor are thoroughly mixed by means of e.g. a mortar, a ball mill or a mixer mill, or by a method of e.g. sieving. Otherwise, the fluorescent composition of the present invention can be obtained by adhering the above conductive material to the surface of particles of the above phosphor, by a conventional method such as a method using gelatin and gum arabic as adhesive (Japanese Examined Patent Publication No. 3677/1979), an electrostatic coating method (Japanese Examined Patent Publication No. 44275/1979) or a method using an organic binder such as ethylene cellulose or nitro cellulose (Japanese Examined Patent Publication No. 33266/1987). Here, the mixing weight ratio of the conductive material to the phosphor is substantially the same as in the case of the conventional fluorescent composition comprising a phosphor with a high resistance and a conductive material. From the viewpoint of the luminance of the resulting fluorescent composition, in the case where the conductive material and the phosphor are simply mixed, it is preferred to adjust the weight ratio of the conductive material/phosphor to a level of from 1/99 to 7/13, and in the case where the conductive material is adhered to the surface of the phosphor particles, it is preferred to adjust the weight ratio of the conductive material/phosphor to a level of from 1/199 to 3/7.

Now, the relation between the degree of crystallization of the phosphor to be used and the luminance of a composition including the fluorescent composition for low velocity electron beam excitation of the present invention, will be described with reference to the drawing.

Curve A in FIG. 1 illustrates the relation between the degree of crystallization of the phosphor to be used and the luminance under low velocity electron beam excitation (at an accelerating voltage of 20 V) of the fluorescent composition thereby obtained, with respect to various fluorescent compositions obtained by mixing $(Zn_{0.29},Cd_{0.71})S:Ag,Cl$ phosphors having different degrees of crystallization and $In_2O_3$ in a weight ratio of 9:1. Curve B in FIG. 1 illustrates the relation between the degree of crystallization of each phosphor and the luminance under high velocity electron beam excitation (at an accelerating voltage of 12 kV) with respect to the $(Zn_{0.29},Cd_{0.71})S:Ag,Cl$ phosphors as constituting components of the above mentioned respective fluorescent compositions. The abscissa in FIG. 1 indicates the half value width ($2\theta$) of the strongest diffraction line in the diffraction X-ray spectrum of $(Zn_{0.29},Cd_{0.71})S:Ag,Cl$, which is an index of the degree of crystallization of the $(Zn_{0.29},Cd_{0.71})S:Ag,Cl$ phosphor used, and the ordinate for Curves A and B indicates a relative value of the luminance of each fluorescent composition, as evaluated on the basis that the luminance of a conventional fluorescent composition using $(Zn_{0.29},Cd_{0.71})S:Ag,Cl$ having a half value width ($2\theta$) of the strongest diffraction line in the diffraction X-ray spectrum being 0.18, is regarded as 100, and a relative value of the luminance of each phosphor, as evaluated on the basis that the luminance of the $(Zn_{0.29},Cd_{0.71})S:Ag,Cl$ phosphor having a half value width ($2\theta$) of the X-ray diffraction line being 0.18, is regarded as 100.

As is evident from Curves A and B in FIG. 1, when the $(Zn_{0.29},Cd_{0.71})S:Ag,Cl$ phosphors having different degrees of crystallization and different half value widths of the strongest diffraction lines in the X-ray diffraction spectra are excited by a high velocity electron beam, no substantial change is observed in the luminance so long as the half value width of the diffraction line is within a certain range (Curve B), whereas when the fluorescent compositions using such phosphors are excited by a low velocity electron beam, the luminance changes substantially depending upon the degree of crystallization of the phosphor used (Curve A), and fluorescent compositions comprising $In_2O_3$ and $(Zn_{0.29},Cd_{0.71})S:Ag,Cl$ phosphors having the half value widths ($2\theta$) of the strongest diffraction lines in the X-ray diffraction spectra being from about 0.05° to 0.16°, exhibit an especially high luminance under low velocity electron beam excitation. Among them, fluorescent compositions comprising $In_2O_3$ and the $(Zn_{0.29}Cd_{0.71})S:Ag,Cl$ phosphors having the half value widths ($2\theta$) of the strongest diffraction lines being from 0.07° to 0.14°, exhibit even higher luminance.

Further, it has been confirmed that also in the case of sulfide-type phosphors other than the $(Zn_{0.29},Cd_{0.71})S:Ag,Cl$ phosphors, no substantial change is observed in the luminance under high velocity electron beam excitation even if the half value width of the strongest diffraction line in the diffraction X-ray spectrum of the phosphor changes, as shown by Curve B, whereas when a fluorescent composition comprising this phosphor and $In_2O_3$ is excited by a low velocity electron beam, the luminance is especially high when the half value width ($2\theta$) of the strongest diffraction line in the diffraction X-ray spectrum of the sulfide phosphor used is within a range of from 0.05° to 0.16°, and this tendency is observed also in the case where conductive materials other than $In_2O_3$ are used.

Accordingly, the sulfide phosphor to be used as a constituting component of the present invention is preferably such that the half value width of the strongest diffraction line in the X-ray diffraction spectrum of the phosphor is within a range of from 0.05° to 0.16°. From the viewpoint of the luminance of the fluorescent composition obtained, it is particularly preferred to employ a sulfide phosphor with the half value width ($2\theta$) of the diffraction line being within a range of from 0.07° to 0.14°.

Now, the present invention will be described in further detail with reference to Examples. However, it should be understood that the present invention is by no means restricted by such specific Examples.

EXAMPLE 1

A phosphor raw material comprising 55 g of zinc sulfide (ZnS) (phosphor grade reagent), 195 g of cadmium sulfide (CdS) (phosphor grade reagent), 0.08 g of silver nitrate ($AgNO_3$) (guaranteed reagent) and 3.0 g of sodium chloride (NaCl) (guaranteed reagent), was thoroughly mixed and filled in a quartz crucible having a lid with the contact surface between the clucible body and the lid being smooth and well fit. The raw material was put in an electric furnace and calcined at 820° C. for 2 hours, and then it was sieved in water and washed with water until the electrical conductivity of the supernatant became less than 10 $\mu s/cm$, followed by water removal and drying to obtain a $(Zn_{0.29},Cd_{0.71})S:Ag,Cl$ phosphor (sulfide phosphor (I)) wherein the concentration of Ag is 200 $\mu g$ per g of the phosphor. Separately, a $(Zn_{0.29},Cd_{0.71})S:Ag,Cl$ phosphor (sulfide phosphor (I-R)) wherein the concentration of Ag was 200 $\mu g$ per g of the phosphor, was prepared in the same manner as the above sulfide phosphor (I) except that instead of 3.0 g of NaCl, 2.5 g was used as a phosphor raw material, the contact surface between the quartz crucible body and the lid was roughened so that the contact between the lid and the crucible body became poor and the calcining temperature was changed to 800° C.

With respect to these sulfide phosphors (I) and (I-R), diffraction X-ray spectra were measured by means of an X-ray diffractometer (manufactured by Regaku Denki K.K.), and the half value widths ($2\theta$) of the respective strongest diffraction lines thereof were determined and found to be 0.11° and 0.18°, respectively.

Then, 93 parts by weight of this sulfide phosphor (I) and 7 parts by weight of commercially available $In_2O_3$ were thoroughly mixed in a ball mill to obtain a fluorescent composition (I).

Further, a fluorescent composition (I-R) was prepared in the same manner as the fluorescent composition (I) except that instead of the sulfide phosphor (I), the sulfide phosphor (I-R) was used.

The respective fluorescent compositions thus obtained were excited by a low velocity electron beam at an acceleration voltage of 20V for emission of light, and the luminance was compared relatively, whereby the luminance of the fluorescent composition (I) was about 1.3 times the luminance of the fluorescent composition (I-R).

EXAMPLE 2

A self-activated ZnS:Zn phosphor (sulfide phosphor (II)) was prepared in the same manner as the sulfide phosphor (I) in Example 1 except that a phosphor raw material comprising 250 g of zinc sulfide (ZnS) (phosphor grade reagent), 2.5 g of sodium chloride (NaCl) (guaranteed reagent), 6.25 g of ammonium chloride ($NH_4Cl$) (guaranteed reagent) and 5.0 g of sulfur (S) (guaranteed reagent), was thoroughly mixed, then put into an electric furnace and calcined at 850° C. for 2.5 hours in air.

Separately, a self-activated ZnS:Zn phosphor (sulfide phosphor (II-R)) was prepared in the same manner as the above sulfide phosphor (II) except that the contact surface between the quartz crucible body and the lid was roughened so that the contact between the lid and the crucible body became poor, and the calcining time was changed to 2 hours.

With respect to these sulfide phosphors (II) and (II-R), the diffraction X-ray spectra were measured by means of an X-ray diffractometer (manufactured by Rigaku Denki K.K.), and the half value width ($2\theta$) of the respective strongest diffraction lines thereof were determined and found to be 0.10° and 0.17°, respectively.

Then, 0.6 part by weight of gelatin was dissolved in warm water of 40° C. to obtain a 0.3% gelatin aqueous solution. Into this solution, 85 parts by weight of the sulfide phosphor (II) was added, and the mixture was thoroughly stirred to obtain a phosphor dispersion.

On the other hand, 0.4 part by weight of gum arabic was dissolved in water to obtain a 0.3% gum arabic aqueous solution. Into this solution, 15 parts by weight of $In_2O_3$ was added, and the mixture was thoroughly stirred to obtain a dispersion of $In_2O_3$ particles.

Then, the above phosphor dispersion and the dispersion of $In_2O_3$ particles were mixed under stirring, and the mixture was adjusted to pH 4 and cooled to a temperature of not higher than 10° C. Then, 1 part by weight of formalin was gradually added under stirring. The supernatant was removed by decantation, and the residue was washed with water. The solid content was dried to obtain a fluorescent composition (II) having $In_2O_3$ adhered to the ZnS:Zn phosphor.

Further, a fluorescent composition (II-R) was prepared in the same manner as the fluorescent composition (II) except that instead of the sulfide phosphor (II), the sulfide phosphor (II-R) was used.

The respective fluorescent compositions thus obtained were excited by a low velocity electron beam at an acceleration voltage of 20V for emission of light, and the luminance was compared relatively, whereby the luminance of the fluorescent composition (II) was about 1.2 times the luminance of the fluorescent composition (II-R).

EXAMPLE 3

A phosphor prepared in the same manner as the sulfide phosphor (I) in Example 1 except that a phosphor raw material comprising 125 g of zinc sulfide (ZnS) (phosphor grade reagent), 125 g of cadmium sulfide (CdS) (phosphor grade reagent), 0.08 g of silver nitrate ($AgNO_3$) and 2.5 g of lithium chloride (LiCl), was thoroughly mixed, then put into an electric furnace and calcined at 800° for 1.5 hours in air, was again put into an electric furnace as filled in a quartz crucible and again calcined at 800° C. for one hour in a nitrogen gas atmosphere, and then it was sieved in water and washed with water until the electrical conductivity in the supernatant became less than 10 μs/cm and dried to obtain a ($Zn_{0.31},Cd_{0.69}$)S:Ag,Cl phosphor (sulfide phosphor (III)) wherein the concentration of Ag was 200 μg per g of the phosphor.

Separately, a sulfide phosphor (III-R) was prepared in the same manner as the sulfide phosphor (III) except that the contact surface between the lid of the quartz crucible and the crucible body was roughened so that the contact between the lid and the crucible body became poor, the calcining time was changed to 1 hour and recalcination in a nitrogen gas was not conducted.

With respect to these sulfide phosphors (III) and (III-R), the diffraction X-ray spectra were measure by means of an X-ray diffractometer (manufactured by Regaku Denki K.K.), and the half value widths ($2\theta$) of the strongest diffraction lines thereof were determined and found to be 0.12° and 0.18°, respectively.

Then, 95 parts by weight of this sulfide phosphor (III) and 5 parts by weight of commercially available zinc oxide (ZnO) were thoroughly mixed in a ball mill to obtain a fluorescent composition (III).

Further, a fluorescent composition (III-R) was prepared in the same manner as the fluorescent composition (III) except that the sulfide phosphor (III-R) was used instead of the sulfide phosphor (III).

The respective fluorescent compositions thus obtained were excited by a low velocity electron beam at an acceleration voltage of 20V for emission of light, and the luminance was relatively compared, whereby the luminance of the fluorescent composition (III) was about 1.15 times the luminance of the fluorescent composition (III-R).

As described in the foregoing, among fluorescent compositions composed of mixtures comprising sulfide phosphors and conductive materials, a fluorescent composition obtained by using a sulfide phosphor, of which the half value width ($2\theta$) of the strongest diffraction line in the diffraction X-ray spectrum is substantially within a range of from 0.05° to 0.16°, as its constituting component, has a remarkably improved luminance under low velocity electron beam excitation at an acceleration voltage of not higher than 1 kV and thus is very useful as a fluorescent material for a fluorescent display tube.

We claim:

1. A fluorescent composition for low velocity electron beam excitation at an acceleration voltage of not higher than 1 kV, comprising a ($Zn_{1-x},Cd_x$)S phosphor wherein x is a number satisfying the condition of $0 \leq x \leq 1$, and an electrically conductive material mixed or mutually adhered to each other, wherein the half value width ($2\theta$) of the strongest diffraction line in the diffraction X-ray spectrum of said sulfide phosphor is within the range of from 0.05° to 0.16°.

2. The fluorescent composition for low velocity electron beam excitation according to claim 1, wherein the half value width is within a range of from 0.07° to 0.14°.

3. The fluorescent composition for low velocity electron beam excitation according to claim 1, wherein the electrically conductive material is indium oxide.

4. The fluorescent composition for low velocity electron beam excitation according to claim 1, wherein said phosphor is activated by Zn, Ag, Cu, Au or Mn.

5. The fluorescent composition for low velocity electron beam excitation according to claim 4, wherein said electrically conductive material is $In_2O_3$, ZnO, $SnO_2$, $TiO_2$, $WO_3$, $Nb_2O_5$, Cds or CuS.

6. The fluorescent composition for low velocity electron beam excitation according to claim 4, wherein said phosphor is further coactivated by a first coactivator of Al or halogen and optionally by a second coactivator of alkali metal, Ga or In.

7. The fluorescent composition for low velocity electron beam excitation according to claim 6, wherein said electrically conductive material is $In_2O_3$, ZnO, $SnO_2$, $TiO_2$, $WO_3$, $Nb_2O_5$, CdS or CuS.

8. The fluorescent composition for low velocity electron beam excitation according to claim 1, wherein said electrically conductive material is $In_2O_3$, ZnO, $SnO_2$, $TiO_2$, $WO_3$, $Nb_2O_5$, CdS or CuS.

9. The fluorescent composition for low velocity electron beam excitation according to claims 1 to 8, wherein when said phosphor and said electrically conductive material are mixed with each other, the weight ratio of the conductive material/phosphor is from 1/99 to 7/13, and when said phosphor and said electrically conductive material mutually adhere to each other, the weight ratio of the conductive material/phosphor is from 1/199 to 3/7.

* * * * *